(12) United States Patent
Dannhauer et al.

(10) Patent No.: US 7,021,149 B2
(45) Date of Patent: Apr. 4, 2006

(54) DIFFERENTIAL PRESSURE SENSOR WITH OVERLOAD DAMPING

(75) Inventors: Wolfgang Dannhauer, Teltow (DE); Dietfried Burczyk, Teltow (DE)

(73) Assignee: Endress & Hauser GmbH & Co. KG, Maulburg (DE)

( * ) Notice: Subject to any disclaimer, the term of this patent is extended or adjusted under 35 U.S.C. 154(b) by 78 days.

(21) Appl. No.: 10/722,566

(22) Filed: Nov. 28, 2003

(65) Prior Publication Data

US 2005/0115326 A1 Jun. 2, 2005

(51) Int. Cl.
*G01L 13/02* (2006.01)
(52) U.S. Cl. .......................................... 73/716; 73/736
(58) Field of Classification Search ................ 73/706, 73/716, 727, 721, 736
See application file for complete search history.

(56) References Cited

U.S. PATENT DOCUMENTS

| | | | | |
|---|---|---|---|---|
| 4,527,428 A | * | 7/1985 | Shimada et al. ............. | 73/721 |
| 4,668,889 A | * | 5/1987 | Adams ........................ | 310/338 |
| 4,713,969 A | * | 12/1987 | Ishii ............................. | 73/706 |
| 4,995,266 A | * | 2/1991 | Tobita et al. .................. | 73/706 |

* cited by examiner

*Primary Examiner*—Max Noori
*Assistant Examiner*—Andre Allen
(74) *Attorney, Agent, or Firm*—Bacon & Thomas

(57) ABSTRACT

A differential pressure sensor includes a measuring mechanism having a chamber on the high-pressure side that is sealed by a first dividing membrane, and a chamber 6 on the low-pressure side that is sealed by a second dividing membrane. The first dividing membrane is loadable with a pressure acting on the high-pressure side and the second dividing membrane with a pressure acting on the low-pressure side, and the chamber on the high-pressure side is separated from the chamber on the low-pressure side by a pressure-sensitive element, especially a measuring membrane, and the chambers of the high- and low-pressure sides are filled with a transfer medium. For damping of overload pulses acting on the first dividing membrane on the high-pressure side, a hydraulic throttle is provided, which is arranged on the low-pressure side between the second dividing membrane and the pressure-sensitive element.

9 Claims, 4 Drawing Sheets

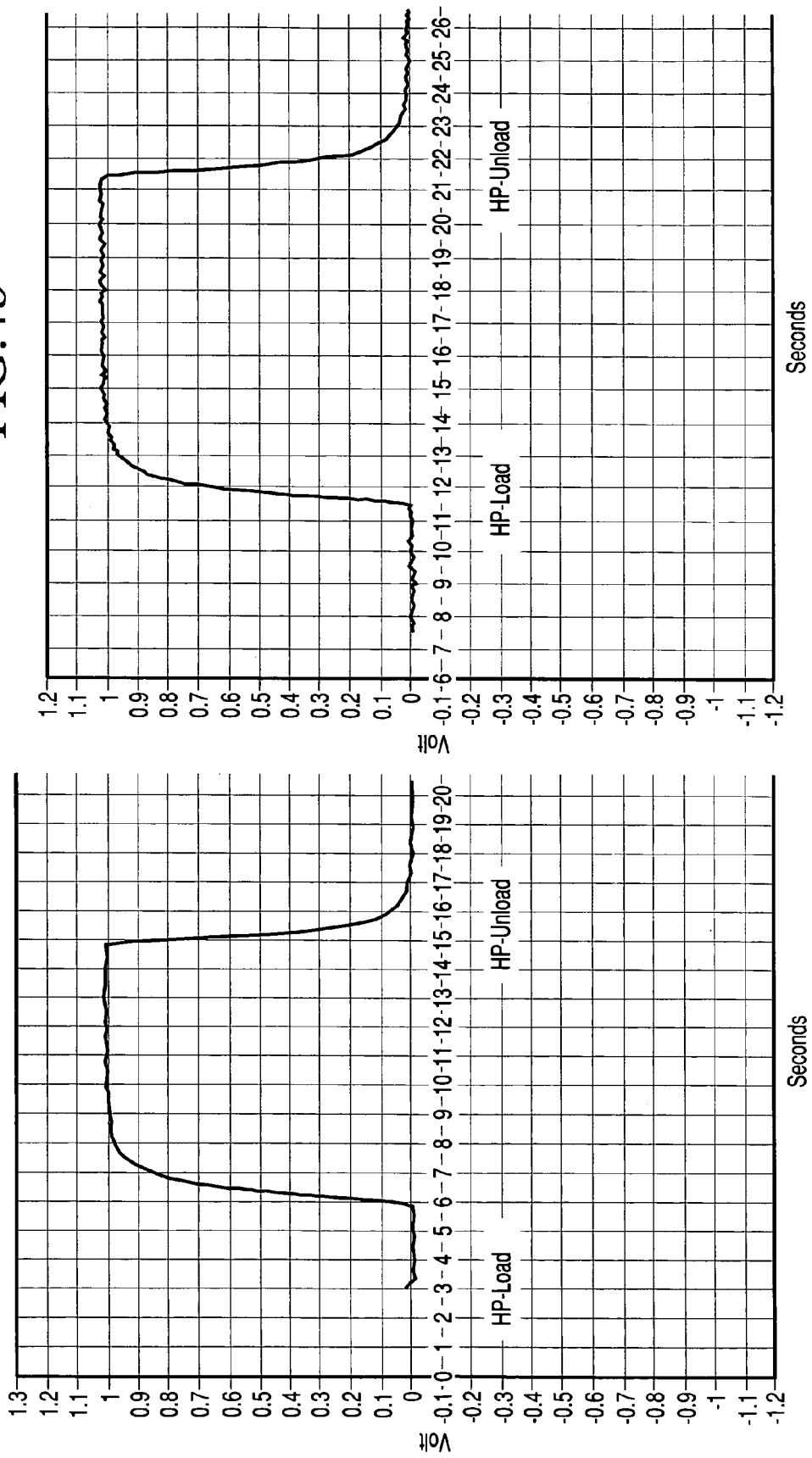

DIFFERENTIAL PRESSURE SENSOR WITH OVERLOAD DAMPING

FIELD OF THE INVENTION

Figure 1:
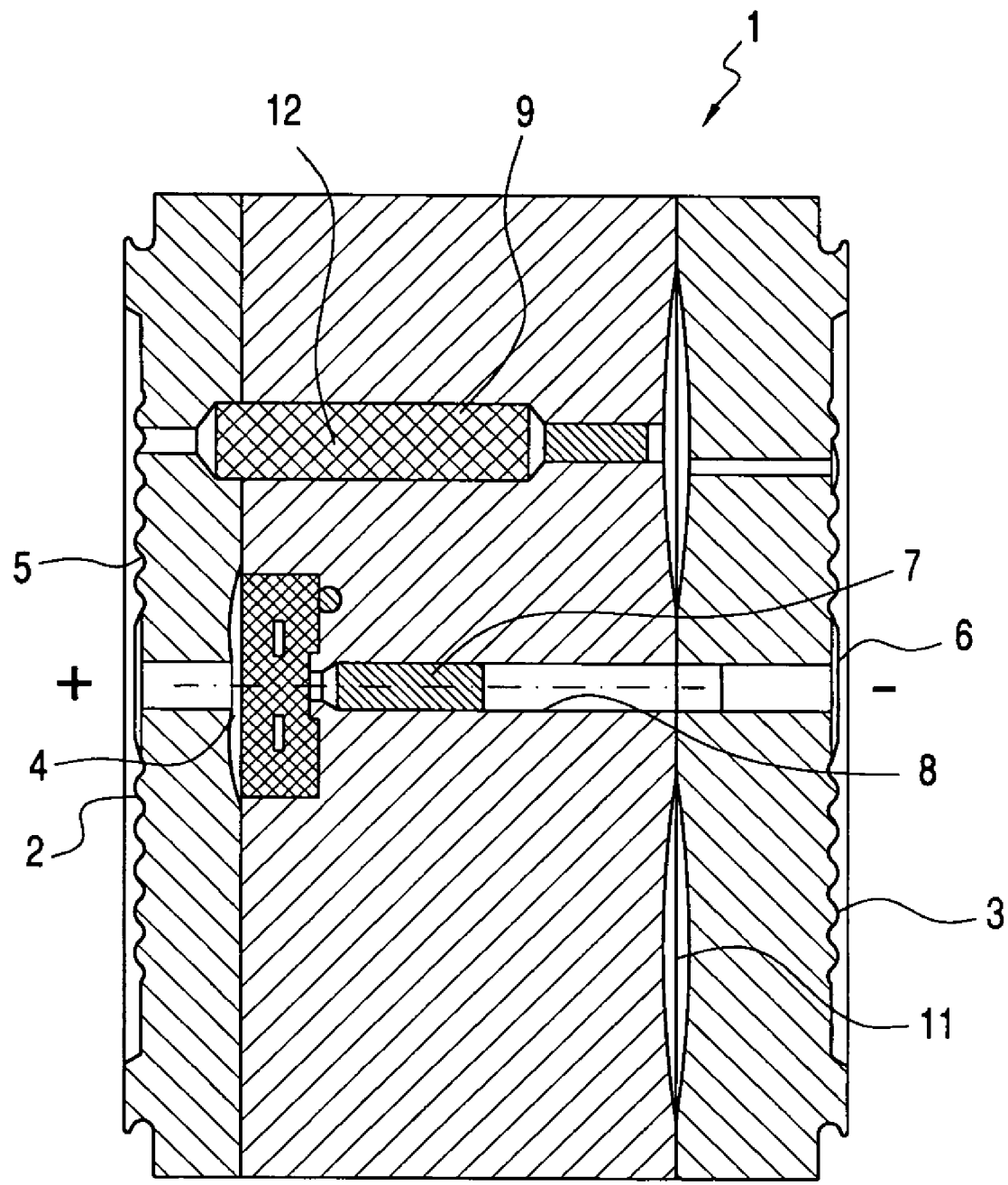

The present invention relates to a differential pressure sensor with hydraulic pressure transfer.

BACKGROUND OF THE INVENTION

Such pressure sensors include, as a rule, a measuring mechanism having a high-pressure chamber on one side and a low pressure chamber on the other. These chambers are each sealed by a dividing membrane, also called a separating diaphragm, and are filled with a transfer medium. The dividing membranes are loaded, respectively, with a pressure acting on the high-pressure side and a pressure acting on the low-pressure side. The two pressures are transferred by way of the dividing membranes into the respective chambers. The chambers are separated from one another by a sensor element. The sensor element includes a pressure-sensitive element, especially a measuring membrane, which is loaded on its first surface with the hydraulic pressure in the chamber of the high-pressure side and on its second surface with the hydraulic pressure in the chamber of the low-pressure side. Particularly pressure-sensitive elements made of semiconductor materials exhibit such a stiffness, that the volume displacement at the pressure-sensitive element is practically negligible over the entire measuring range. This makes these pressure-sensitive elements, however, very sensitive to overloads, since there is hardly any elasticity present to absorb them. Destruction of the measuring cell can result. A static overload protection is usually provided by having a mechanical overload protector push liquid, in the case of a unilateral overload, from the high-pressure side to the low-pressure side (or vice versa) and by having the dividing membranes come to rest on respective surfaces. This prevents a further increase in pressure.

Dynamic overload peaks in the form of pressure shocks present another problem. It is true that designs of differential pressure sensors are oriented toward structuring the cells on both sides, the high-pressure (HP) side and the low-pressure (LP) side, to a large extent symmetrically (same routing, liquid volumes, membranes, etc.), in order to minimize temperature and pressure errors, but asymmetries, at least with regard to dynamic behavior, cannot always be avoided, because of other boundary conditions. In the case of dynamic, bilateral loads, such as pressure shocks during hot steam measurements, pulses from piston pumps, concussions in closed container systems, these lead to travel time differences between the HP and the LP sides and, consequently, to associated, transient pressure peaks at the sensor. The chip is destroyed and the device stops working.

Simple lessening of the diameter, for example, of the pressure supply line between the chamber on the high-pressure side and the pressure-sensitive element does not effectively damp the pressure spikes.

German Offenlegungsschrift (laid open Patent Application) DE 376 13 236 A1 discloses a pressure sensor, in which a sintered metal plate or a steel plate with a bore or a plurality of parallel bores of, at most, 0.5 mm diameter are inserted between the process and the measuring cell. This solution is unsatisfactory for a number of reasons. On the one hand, the reduction of the hydraulic path between process and measuring cell to even a single bore of 0.5 mm diameter with a bore length in keeping with the illustrated plate thickness does not, by far, provide sufficient damping to suppress spike-type overload pressure shocks. If, on the other hand, a damping element is provided that has sufficiently large flow resistance for an effective damping, then the reaction velocity of the differential pressure sensor is significantly slowed, so that pressure fluctuations that are within the measurement range of the sensor are then only registered after a delay.

An object of the present invention is, therefore, to provide a differential pressure sensor which overcomes the above-described disadvantages.

SUMMARY OF THE INVENTION

The object is solved by the differential pressure sensor which comprises a measuring mechanism which has: a chamber on the high-pressure side that is sealed by a first dividing membrane and filled with a transfer medium; a chamber on the low-pressure side that is sealed by a second dividing membrane and filled with a transfer medium; a pressure sensitive element which separates the two chambers; and a throttle for damping overload pulses. The throttle is arranged betwen the pressure sensitive element and the second dividing membrane.

The differential pressure sensor of the invention includes a measuring mechanism having a chamber on the high-pressure side that is sealed by a first dividing membrane, and a chamber on the low-pressure side that is sealed by a second dividing membrane, wherein the first dividing membrane is loadable with a pressure acting on the high-pressure side and the second dividing membrane with a pressure acting on the low-pressure side, and the chamber on the high-pressure side is separated from the chamber on the low-pressure side by a pressure-sensitive element, especially a measuring membrane, the chambers of the high- and low-pressure sides are filled with a transfer medium, and wherein, additionally, the chamber on the low pressure side has a hydraulic throttle, which is arranged between the second dividing membrane and the pressure-sensitive element.

The throttle comprises preferably a porous body, especially a porous sintered body, especially preferably a sintered body of a metallic or a ceramic material, especially a corundum filter or a bronze filter. Suitable bronze filters are, for example, those obtainable from the firm GKN in Radevormwald, Germany, under the designation SIKA-B.

The throttle is preferably dimensioned such that the volume flow, which is released by an overload shock on the high-pressure side and transferred into the chamber on the low-pressure side via the measuring membrane, experiences such a large flow resistance through the throttle, that the measuring membrane becomes supported on the low-pressure side by the hydraulic pressure between the measuring membrane and the throttle.

In contrast, slow volume flows are entirely possible through the throttle, so that, on the one hand, an equalization of volume changes of the transfer liquid because of temperature changes can occur, and, on the other hand, relatively slow, normal fluctuations of the pressures acting on the high- and low-pressure sides can be transmitted sufficiently quickly to the measuring membrane.

Preferably, the effective flow pore diameter (MFP, or mean flow pore size), determined with a Coulter Porometer according to ASTM E 1294 with isopropanol as wetting agent, is not less than 4 µm and not more than 28 µm, while, currently, effective flow diameters between 8 µm and 16 µm are especially preferred. The effective flow diameters are preferably used in combination with a porosity between 15 vol. % and 50 vol. %, especially preferably between 25 vol % and 35 vol %.

Cylindrical throttle bodies are preferred in so far as these can be used in complementary bores in the second, low-pressure side. Preferably, the throttle bodies have a length which is at least twice as large as the diameter of the throttle bodies, while, in a currently especially preferred embodiment, the length of the throttle body is about four-times the diameter.

The particulars of the throttle relative to pore size, porosity, and geometrical dimensions depend in a given application, among other things, on the strength of the measuring membrane under pressure and on the overloads to be expected, as well as on the structural boundary conditions. Those skilled in the art are able to optimize the design of the throttle for a given differential pressure sensors.

A further parameter is the amount of the transfer liquid enclosed between the pressure-sensitive element and the throttle. In so far as the transfer liquid is compressible to a slight degree, the supporting effect of the throttle is decreased, the greater the volume of the transfer liquid between the measuring membrane and the throttle. Preferably, this volume is minimized within the framework of the design boundary conditions.

SUMMARY OF THE INVENTION

The invention will now be explained in greater detail on the basis of an example of an embodiment presented in FIG. 1 and the data shown in FIGS. 2 and 3.

Figure 2:
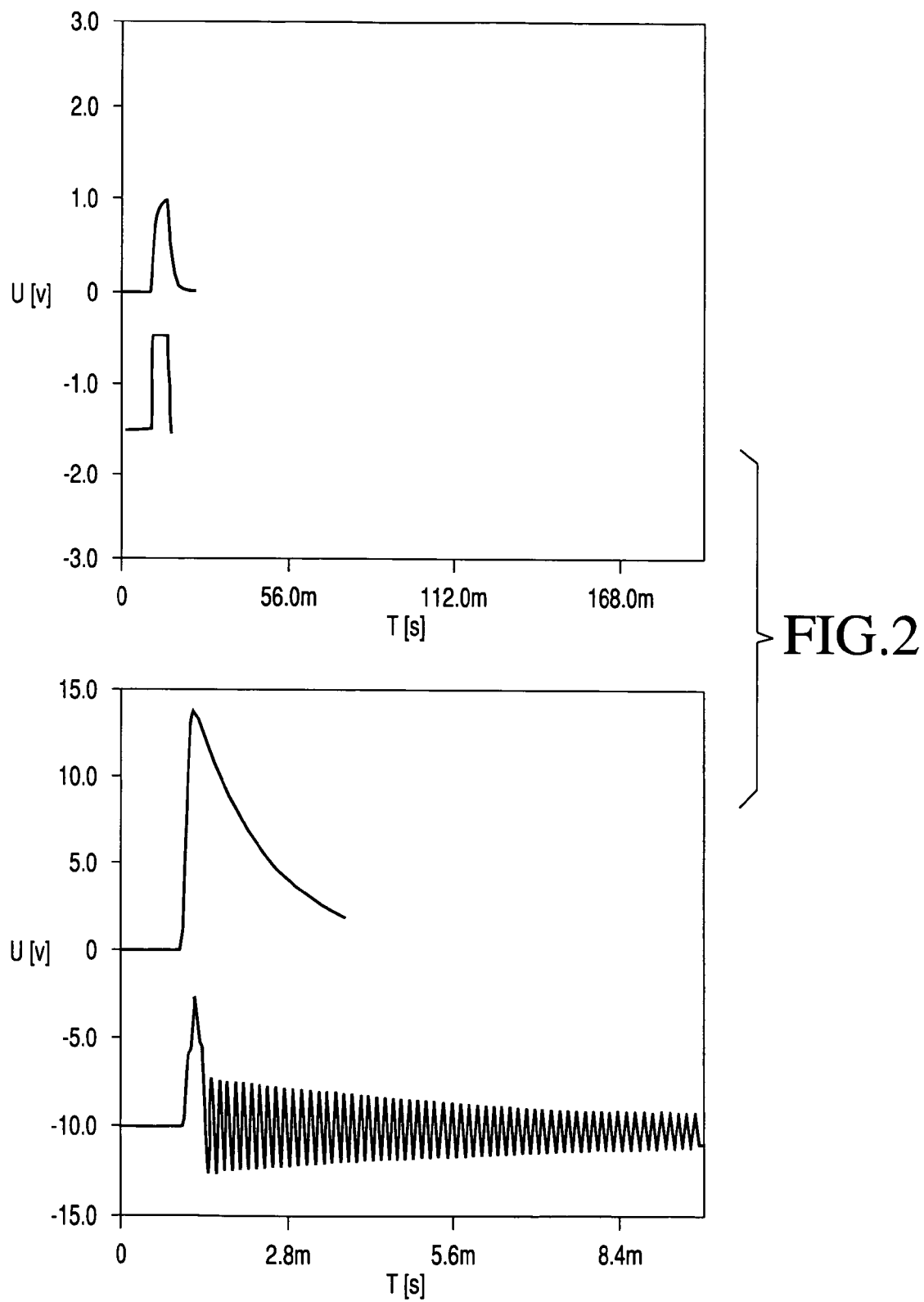
Figure 3:
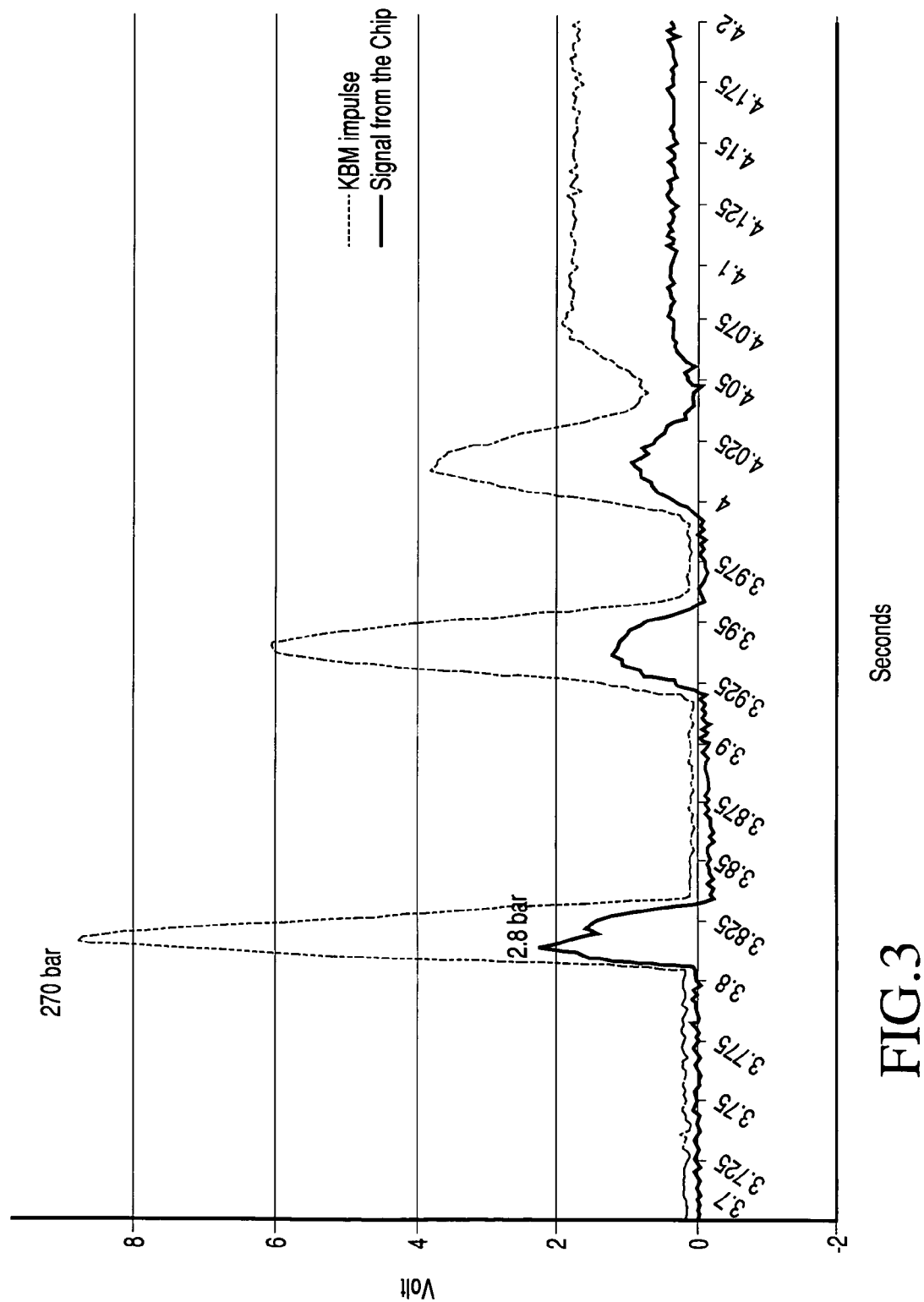

FIG. 1—is a cross section through a differential pressure sensor of the invention;

FIG. 2—shows simulation results on the response of a measuring membrane to pressure pulses in the measuring range and in the case of overload, for a differential pressure sensor of the invention and a differential pressure sensor with a throttle on the process side;

FIG. 3—shows the measured pressure on the measuring cell in the case of a dynamic overload on the high-pressure side; and FIG. 4—shows the transient response of a differential pressure sensor of the invention in the measuring range.

DESCRIPTION OF THE PREFERRED EMBODIMENTS

The differential pressure sensor shown in FIG. 1 includes a measuring mechanism 1 having a chamber 5, located on a high-pressure side and sealed by a first dividing membrane 2, and a chamber 6, located on a low-pressure side and sealed by a second dividing membrane 3. Within the measuring mechanism is a pressure-sensitive element 4, which has a measuring membrane. The pressure-sensitive element 4 separates the chamber 5 on the high-pressure side from the chamber 6 on the low-pressure side. In the preferred embodiment, the pressure-sensitive element is a piezoresistive, silicon chip. In principle, however, the invention is independent of the particular way in which the pressure-sensitive element works.

The chamber on the high-pressure side and the chamber on the low-pressure side are filled completely with a transfer medium, preferably a silicone oil.

A throttle 7 is arranged in the chamber 6 of the low-pressure side. For this purpose, the chamber on the low-pressure side has a bore 8, in which the throttle is fixed by a force fit.

The preferred throttle comprises a filter element of sintered bronze having a porosity of about 29% and a effective flow pore diameter of about 11 μm. The preferred filter element has a length of 8 mm and a diameter of 2 mm (the proportions in FIG. 1 are not correct).

The arrangement of the invention leads to a sufficient damping of overload pressure spikes, while pressure pulses within the measuring range are registered sufficiently quickly, as will be explained below on the basis of FIG. 2.

To illustrate the way in which the differential pressure sensor of the invention works, FIG. 2 shows the result of simulation of the hydrodynamic properties of a measuring mechanism by means of an electrodynamic analog using the program PSPICE. In the figure parts, the response of a differential pressure sensor constructed approximately according to DE 37 13 236 A1 with a throttle on the high-pressure side (upper curve) is compared with the response of a differential pressure sensor of the invention (lower curve). For the throttle on the high-pressure side, a canal with a length of 8 mm and a diameter of 0.2 mm was modeled. (A throttle for the high-pressure side in the nature of the throttle used in the invention on the atmosphere side would have led to an almost complete damping of the measured signal and to time constants much too long.) The term "response" here designates the signal emitted by the pressure-sensitive element. Such is, naturally, also a measure of the loading of the pressure-sensitive element.

The upper part of FIG. 2 shows the response to a rectangular pulse of amplitude 1 bar, or 1 volt, which lies within the measuring range of the differential pressure sensor. The throttle on the high-pressure side according to the state of the art smoothes the rectangular pulse, and cannot follow the time behavior sufficiently quickly. In contrast, the throttle of the invention, on the low-pressure side, degrades the response to the rectangular pulse practically not at all.

The lower part of FIG. 2 shows the response of the differential pressure sensor to a short, rectangular pulse in the case of overload, having an amplitude of 100 bar, or 100 volts. The throttle on the high-pressure side causes a damping of the response to about 14 bars, or 14 volts, while the large time constant of the throttle causes a slow decay of the response, as shown in the upper curve. The damping by the throttle on the low-pressure side according to the invention proves to be better, as evidenced by the amplitude of the response amounting to only about 7 bar, or 7 volts. In addition, the equilibrium position of the response decreases more quickly back to the starting value, due to the shorter time constant, with the response oscillating with a damped oscillation about the equilibrium position. With suitable evaluation circuitry, the average value can easily be extracted, as well.

Experimental confirmation of the concept of the invention is shown in FIGS. 3 and 4.

FIG. 3 shows the response to overload pressure shocks on the high-pressure side.

The dotted line shows the course of the hydraulic pressure difference acting on the differential pressure sensor, while the continuous line presents the pressure acting on the silicon chip in the differential pressure sensor. The two curves are scaled differently for purposes of clarity. Comparison of the curves shows that the overload shocks are reliably damped by the sintered metal and cannot destroy the silicon chip.

FIG. 4 shows, finally, that the dynamic behavior of the differential pressure sensor is not degraded by the sintered metal damping. FIG. 4 compares the transient responses to a rectangular pulse within the measuring range for a differential pressure sensor of the invention with a sintered metal support on the low-pressure side (FIG. 4a) versus a differential pressure sensor lacking such a sintered metal support (FIG. 4b). Practically no difference in the dynamics of the transient responses can be recognized.

As a result, the differential pressure sensor of the invention with a throttle on a low-pressure side proves to be of advantage, since it can follow the response function of rapid changes within the measuring range faster than is the case for pressure sensors having a throttle on the process side. Moreover, the damping of pressure spikes in the case of overload is at least as good with the differential pressure sensor of the invention as with a differential pressure sensor of the prior art.

The invention claimed is:

1. A differential pressure sensor for measuring the pressure difference between a pressure acting on a high-pressure side and a pressure acting on a low-pressure side, comprising:

A measuring mechanism having:
- a chamber on the high-pressure side that is sealed by a first dividing membrane and filled with a transfer medium, said first dividing membrane is loaded with a pressure acting on the high-pressure side;
- a chamber on the low-pressure side that is sealed by a second dividing membrane and filled with a transfer medium, said second dividing membrane is loaded with a pressure acting on the low-pressure side;
- a pressure-sensitive element which separates said chamber on the high-pressure side from said chamber on the low-pressure side; and
- a single throttle for damping overload pulses; wherein:
said throttle is arranged on the low pressure side between said pressure-sensitive element and said second dividing membrane; and
no throttle is arranged on the high pressure side.

2. The differential pressure sensor as claimed in claim 1, wherein:
said transfer medium is a hydraulic liquid, especially a silicone oil.

3. The differential pressure sensor as claimed in claim 1, wherein:
said pressure-sensitive element has a measuring membrane, especially a piezoresistive silicon chip with a measuring membrane.

4. The differential pressure sensor as claimed in claim 1, wherein:
said throttle has a sintered body.

5. The differential pressure sensor as claimed in claim 4, wherein;
said sintered body is a metallic or a ceramic sintered body.

6. The differential pressure sensor as claimed in claim 1, wherein:
said throttle has a porous structure.

7. The differential pressure sensor as claimed in claim 6, wherein;
said porous structure has an effective flow pore diameter of not less than 4 μm and not more than 28 μm, preferably between 8 μm and 16 μm.

8. The differential pressure sensor as claimed in claim 6, wherein:
said the porous structure has a porosity between 15 vol. % and 50 vol. %, preferably between 25 vol % and 35 vol %.

9. The differential pressure sensor as claimed in claim 4, wherein:
said sintered body has an essentially cylindrical form and the length of said sintered body in the axial direction is at least twice as large as the diameter.

* * * * *